(12) United States Patent
Tachibana et al.

(10) Patent No.: US 6,874,469 B2
(45) Date of Patent: Apr. 5, 2005

(54) CONTROL SYSTEM FOR INTERNAL COMBUSTION ENGINE

(75) Inventors: Yosuke Tachibana, Wako (JP); Eisei Yamazaki, Wako (JP); Eiji Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/349,358

(22) Filed: Jan. 21, 2003

(65) Prior Publication Data

US 2003/0136376 A1 Jul. 24, 2003

(30) Foreign Application Priority Data

Jan. 22, 2002  (JP) ........................................ 2002-012449

(51) Int. Cl.[7] ................................................. F02D 1/00
(52) U.S. Cl. ..................... 123/396; 123/399; 123/90.15
(58) Field of Search ................................ 123/396, 399, 123/90.15, 361

(56) References Cited

U.S. PATENT DOCUMENTS

| | | | | |
|---|---|---|---|---|
| 5,669,335 A | * | 9/1997 | Hollis | ........................ 123/41.1 |
| 6,044,808 A | * | 4/2000 | Hollis | ........................ 123/41.1 |
| 6,425,357 B2 | * | 7/2002 | Shimizu et al. | .......... 123/90.16 |
| 6,463,912 B1 | * | 10/2002 | Fuwa | .......................... 123/480 |

FOREIGN PATENT DOCUMENTS

JP        2000-104571        4/2000

* cited by examiner

Primary Examiner—John T. Kwon
(74) Attorney, Agent, or Firm—Anthony A. Laurentano; Lahive & Cockfield, LLP (57) ABSTRACT

A control system for an internal combustion engine having at least one intake valve and at least one exhaust valve is disclosed. The control system includes a valve operating characteristic varying mechanism and a hydraulic control valve for controlling a hydraulic pressure to be supplied to the valve operating characteristic varying mechanism. The valve operating characteristic varying mechanism continuously varies an operating phase of the at least one intake valve and/or the at least one exhaust valve of the engine. A cleaning operation of the hydraulic control valve is performed in a predetermined operating condition of the engine. An intake air amount of the engine is controlled according to an operating condition of the valve operating characteristic varying mechanism when the cleaning operation of the hydraulic control valve is performed.

14 Claims, 8 Drawing Sheets

CONTROL SYSTEM FOR INTERNAL COMBUSTION ENGINE

BACKGROUND OF THE INVENTION

The present invention relates to a control system for an internal combustion engine having a valve operating characteristic varying mechanism for continuously varying an operating phase (valve timing) of intake valves and/or exhaust valves.

A control system for an internal combustion engine having a valve operating characteristic varying mechanism for continuously varying an operating phase of intake valves and/or exhaust valves is described in Japanese Patent Laid-open No. 2000-104571, for example. In the control system described in this publication, a cleaning operation is performed to remove foreign matter deposited to a hydraulic control valve for controlling a hydraulic pressure to be supplied to the valve operating characteristic varying mechanism. This cleaning operation is performed by alternately supplying a maximum current and a minimum current for driving the hydraulic control valve when a vehicle is decelerated by an engine brake or when the fuel supply to the engine is interrupted, to thereby operate the hydraulic control valve over all its operable range.

The above cleaning operation causes a large change in a valve overlap amount (a time period during which both the intake valve and the exhaust valve are open), so that an efficiency of the engine as a pump changes and a pressure in an intake pipe also changes. As a result, a feeling of deceleration of the vehicle changes even when the vehicle is decelerated by the engine brake, or when the fuel supply to the engine is interrupted, which often causes a strange feeling to a driver of the vehicle.

SUMMARY OF THE INVENTION

It is accordingly an object of the present invention to provide a control system for an internal combustion engine that can eliminate the strange feeling in the vehicle behavior due to the cleaning operation of the hydraulic control valve for controlling the operation of the valve operating characteristic varying mechanism.

To achieve the above object, the present invention provides a control system for an internal combustion engine having at least one intake valve and at least one exhaust valve. The control system includes intake air amount control means, a valve operating characteristic varying mechanism, a hydraulic control valve, cleaning means, and control means. The intake air amount control means controls an intake air amount of the engine. The valve operating characteristic varying mechanism continuously varies an operating phase of at least one of the at least one intake valve and the at least one exhaust valve. The hydraulic control valve controls a hydraulic pressure to be supplied to the valve operating characteristic varying mechanism. The cleaning means performs a cleaning operation of the hydraulic control valve when the engine operates in a predetermined operating condition. The control means controls an operation of the intake air amount control means according to an operating condition of the valve operating characteristic varying mechanism when the cleaning means performs the cleaning operation.

With this configuration, the operation of the intake air amount control means is controlled according to the operating condition of the valve operating characteristic varying mechanism when the cleaning operation for the hydraulic control valve is performed. Accordingly, changes in the intake pressure during the cleaning operation can be suppressed to thereby eliminate a strange feeling in the vehicle behavior. For example, when the valve operating characteristic varying mechanism continuously varies the operating phase of the intake valve with a fixed operating phase of the exhaust valve, the intake air amount control means is controlled so that the intake air amount decreases with an advance in the operating phase of the intake valve, thereby suppressing changes in the intake pressure due to changes in the operating phase of the intake valve. As a result, a strange feeling in the vehicle behavior can be eliminated.

Preferably, the valve operating characteristic varying mechanism continuously varies the operating phase of the at least one intake valve with a fixed operating phase of the at least one exhaust valve, and the control means controls the intake air amount control means so as to decrease the intake air amount with an advance in the operating phase of the at least one intake valve.

Alternatively, the valve operating characteristic varying mechanism continuously varies the operating phase of the at least one exhaust valve with a fixed operating phase of the at least one intake valve, and the control means controls the intake air amount control means so as to decrease the intake air amount with a retard in the operating phase of the at least one exhaust valve.

Alternatively, the valve operating characteristic varying mechanism continuously varies the operating phases of the at least one intake valve and the at least one exhaust valve, and the control means controls the intake air amount control means so as to decrease the intake air amount with a decrease in a difference between the operating phase of the at least one intake valve and the operating phase of the at least one exhaust valve.

Preferably, the predetermined operating condition of the engine is an operating condition in which a fuel supply to the engine is interrupted.

Preferably, the cleaning means performs the cleaning operation by changing an opening degree of the hydraulic control valve.

Preferably, the cleaning means gradually increases an amplitude of change in the opening degree of the hydraulic control valve to perform the cleaning operation.

DETAILED DESCRIPTION OF THE PREFERRED EMBODIMENTS

A preferred embodiment of the present invention will now be described with reference to the drawings.

Figure 1:
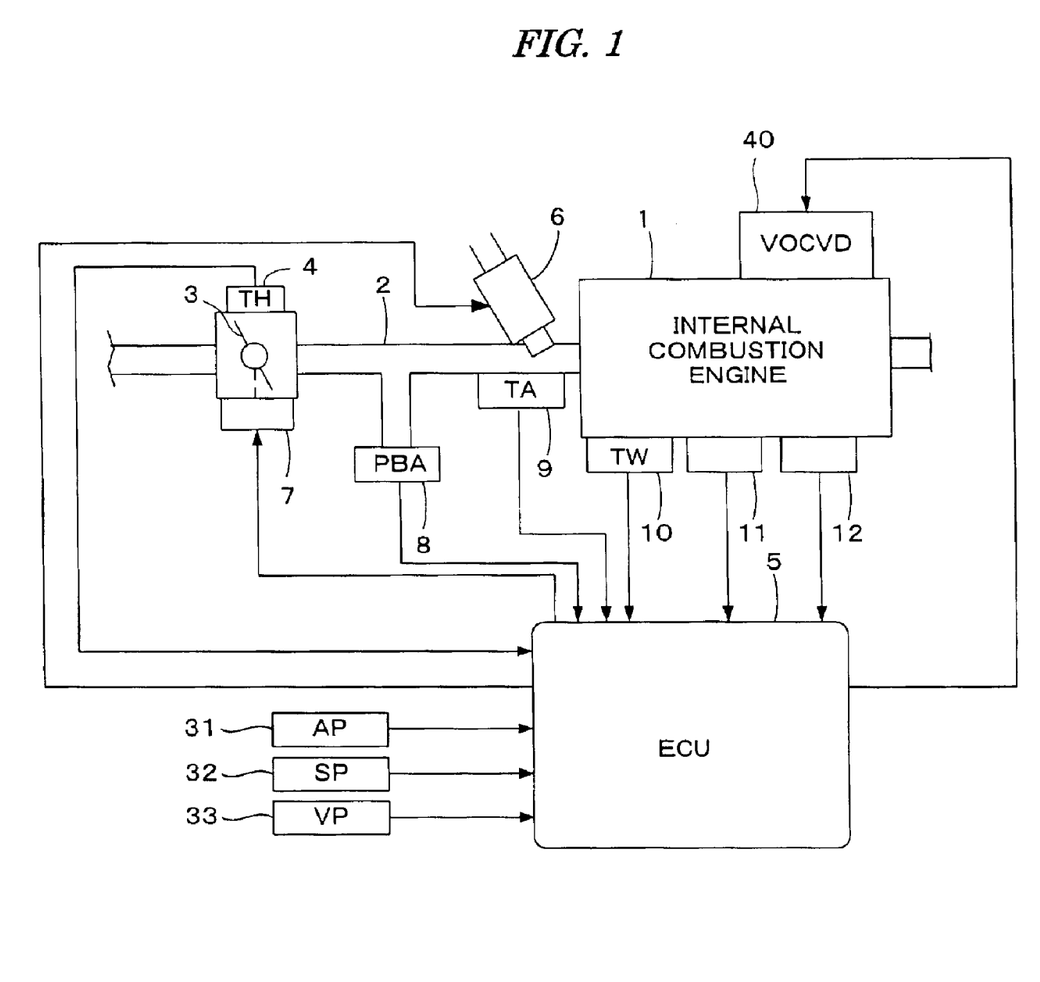
FIG. 1 is a schematic diagram showing the configuration of an internal combustion engine and a control system therefor according to a preferred embodiment of the present invention.
Figure 2:
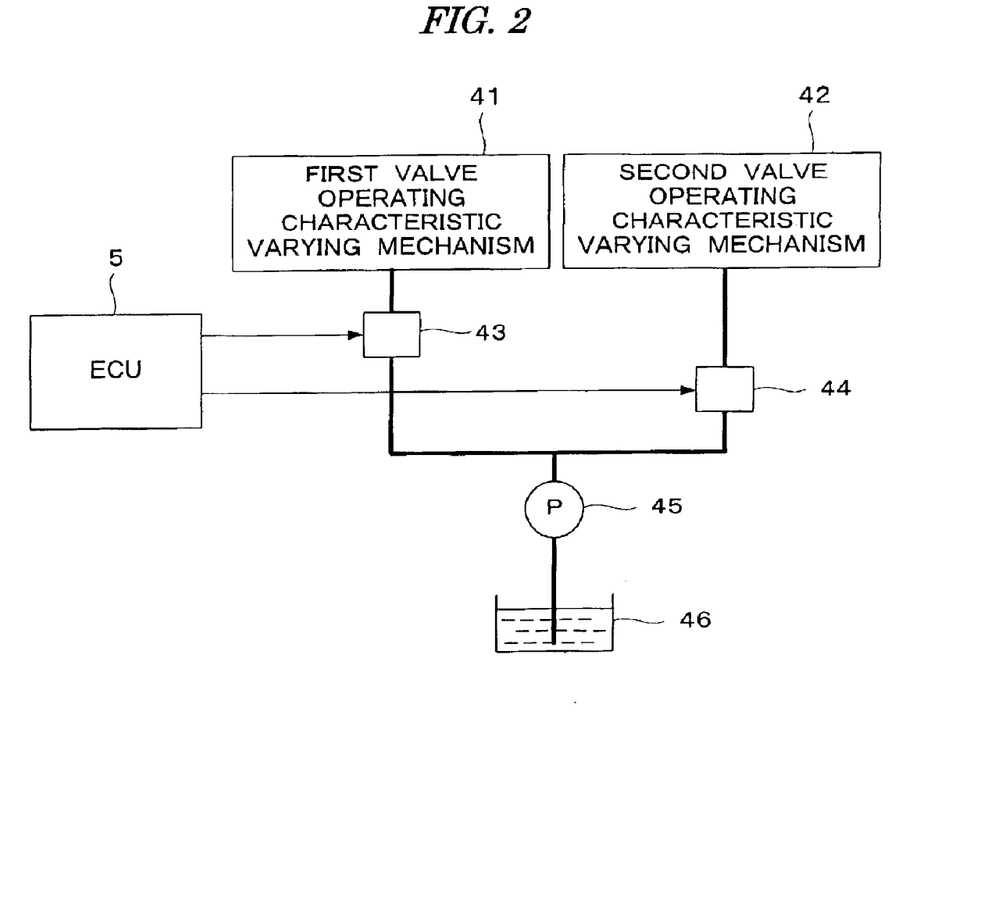
FIG. 2 is a block diagram for illustrating the configuration of a valve operating characteristic varying device.

Referring to FIG. 1, there is schematically shown a general configuration of an internal combustion engine (which will be hereinafter referred to simply as "engine") and a control system therefor according to a preferred embodiment of the present invention. FIG. 2 is a block diagram showing the configuration of a valve operating characteristic varying device 40 (VOCVD) shown in FIG. 1. The engine is a four-cylinder engine 1, for example, and it has intake valves (not shown), exhaust valves (not shown), and cams (not shown) for driving the intake valves and the exhaust valves. The engine 1 is provided with a valve operating characteristic varying device 40 having a first valve operating characteristic varying mechanism 41 and a second valve operating characteristic varying mechanism 42. The first valve operating characteristic varying mechanism 41 switches valve lift amounts and opening angles of the intake valves and the exhaust valves between two stages. The second valve operating characteristic varying mechanism is a cam phase varying mechanism for continuously varying the operating phases of the cams for driving the intake valves with reference to a crank angle (a rotational angle of a crank shaft of the engine 1). The operating phase of each intake valve is the same as the operating phase of the corresponding cam for driving this intake valve.

The engine 1 has an intake pipe 2 provided with a throttle valve 3. A throttle valve opening (TH) sensor 4 is connected to the throttle valve 3, so as to output an electrical signal corresponding to an opening angle of the throttle valve 3 and supply the electrical signal to an electronic control unit (which will be hereinafter referred to as "ECU") 5. An actuator 7 for actuating the throttle valve 3 is connected to the throttle valve 3, and the operation of the actuator 7 is controlled by the ECU 5.

Fuel injection valves 6, only one of which is shown, are inserted into the intake pipe 2 at locations intermediate between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8 is supplied to the ECU 5. An intake air temperature (TA) sensor 9 is provided downstream of the absolute intake pressure sensor 8 to detect an intake air temperature TA. An electrical signal corresponding to the detected intake air temperature TA is output from the sensor 9 and supplied to the ECU 5.

An engine coolant temperature (TW) sensor 10, such as a thermistor is mounted on the body of the engine 1 to detect an engine coolant temperature (cooling water temperature) TW. A temperature signal corresponding to the detected engine coolant temperature TW is output from the sensor 10 and supplied to the ECU 5.

A crank angle position sensor 11 and a cam angle position sensor 12 are also connected to the ECU 5. The crank angle position sensor 11 is provided to detect a rotational angle of the crankshaft of the engine 1, and the cam angle position sensor 12 is provided to detect a rotational angle of a camshaft (not shown) to which the cams for driving the intake valves of the engine 1 are fixed. A signal corresponding to the rotational angle detected by the crank angle position sensor 11 and a signal corresponding to the rotational angle detected by the cam angle position sensor 12 are supplied to the ECU 5. The crank angle position sensor 11 generates one pulse at every given crank angle (e.g., 30 degrees) (this pulse will be hereinafter referred to as "CRK pulse") and a pulse for specifying a predetermined angle position of the crankshaft. The cam angle position sensor 12 generates a pulse at a predetermined crank angle position of a specific cylinder of the engine 1 (this pulse will be hereinafter referred to as "CYL pulse"). The cam angle position sensor 12 further generates a pulse at a top dead center (TDC) from which an intake stroke of each cylinder starts (this pulse will be hereinafter referred to as "TDC pulse"). These pulses are used for control of various timings such as a fuel injection timing and an ignition timing, and for detection of an engine rotational speed NE. An actual operating phase CAIN of the crankshaft can be detected from the correlation between the TDC pulse output from the cam angle position sensor 12 and the CRK pulse output from the crank angle position sensor 11.

As shown in FIG. 2, the valve operating characteristic varying device 40 includes a first valve operating characteristic varying mechanism 41, a second valve operating characteristic varying mechanism 42, a first solenoid valve 43, and a second solenoid valve 44. The first valve operating characteristic varying mechanism 41 switches valve lift amounts and opening angles (these will be hereinafter referred to as "first valve operating characteristic") of the intake valves and the exhaust valves between two stages. The second valve operating characteristic varying mechanism 42 is a cam phase varying mechanism which continuously varies operating phases of the intake valves. The first solenoid valve 43 switches the first valve operating characteristic between a high-speed operating characteristic suitable for a high-speed operation of the engine and a low-speed operating characteristic suitable for a low-speed operation of the engine 1. The second solenoid valve 44 is a valve whose opening degree is continuously variable for the purpose of continuous change in the operating phases of the intake valves. As a parameter indicating the operating phases of the intake valves, the operating phase CAIN of the camshaft is used. A lubricating oil contained in an oil pan 46 is pressurized by an oil pump 45, and supplied to the solenoid valves 43 and 44. A specific configuration of the valve operating characteristic varying device 40 is described in Japanese Patent Laid-open No. 2000-227013, the contents of which are hereby incorporated by reference.

Figure 3:
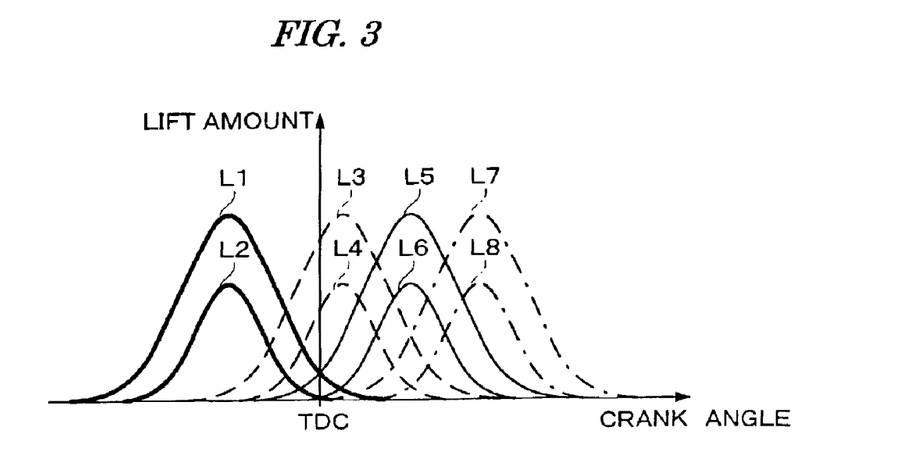
FIG. 3 is a graph showing valve operating characteristics.

According to the valve operating characteristic varying device 40, the exhaust valves are driven with either the high-speed operating characteristic shown by a solid line L1 in FIG. 3 or the low-speed operating characteristic shown by a solid line L2 in FIG. 3. The intake valves are driven with a phase varying from the most advanced phase shown by broken lines L3 and L4 in FIG. 3 to the most retarded phase shown by dot-and-dash lines L7 and L8 in FIG. 3 according to a change in the operating phase CAIN of the camshaft. In FIG. 3, a solid line L5 indicates a typical high-speed operating characteristic of the intake valves, a solid line L6 indicates a typical low-speed operating characteristic of the intake valves.

Referring back to FIG. 1, an acceleration sensor 31, a shift position sensor 32, and a vehicle speed sensor 33 are also connected to the ECU 5. The acceleration sensor 31 is provided to detect a depression amount AP of an accelerator pedal of a vehicle driven by the engine 1. The shift position sensor 32 is provided to detect a shift position SP of a transmission of the vehicle. The vehicle speed sensor 33 is provided to detect a running speed (vehicle speed) of the vehicle. Detection signals from these sensors 31, 32, and 33 are supplied to the ECU 5.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU5 further includes a central processing unit (which will be hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, and the solenoid valves 43 and 44.

The CPU in the ECU 5 performs a control of an opening of the throttle valve 3, a control of an amount of fuel to be supplied to the engine 1 (the opening time of each fuel injection valve 6), and a control of the valve operating characteristic varying mechanisms 41 and 42 through the solenoid valves 43 and 44, according to the detection signals from the above-mentioned sensors.

Further, a cleaning process for the solenoid valve 44 for controlling the second valve operating characteristic varying mechanism 42 (this process will be hereinafter referred to as "VTC cleaning process") is executed by changing a value of an electric current to be supplied to the solenoid valve 44 from a minimum value to a maximum value in the condition where the fuel supply to the engine 1 is interrupted at deceleration of the vehicle. By this process, the operating phase CAIN of each intake valve changes from a most retarded phase CAINMIN to a most advanced phase CAINMAX.

Figure 4:
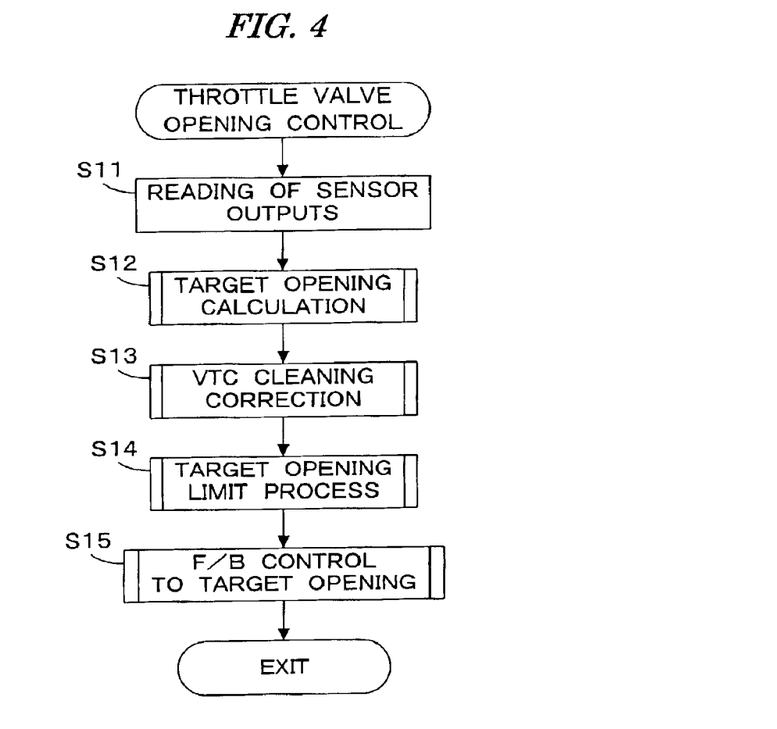
FIG. 4 is a flowchart showing a program for controlling a throttle valve opening.

FIG. 4 is a flowchart showing a throttle valve opening control process. This process is executed by the CPU of the ECU 5 at predetermined time intervals (e.g., 5 msec).

Figure 5:
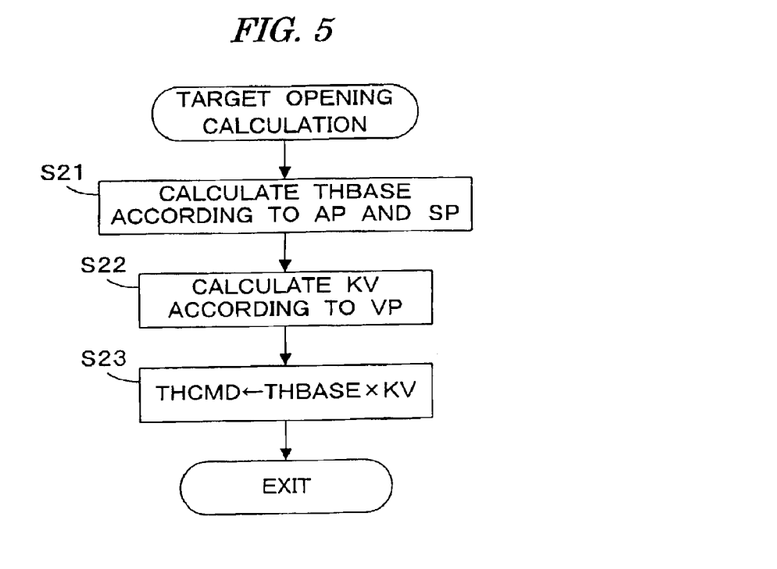
FIG. 5 is a flowchart showing a program for computing a target opening (THCMD)
Figure 8:
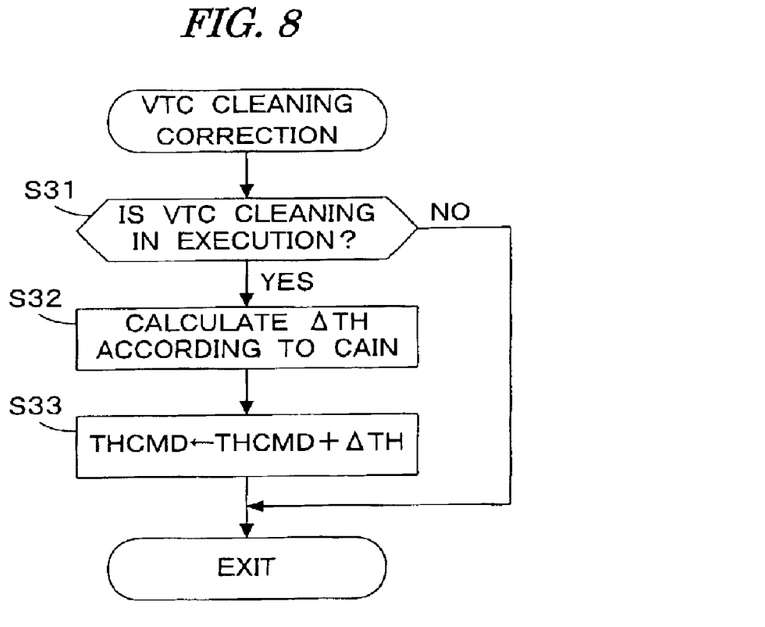
FIG. 8 is a flowchart showing a program for correcting the target opening in association with a cleaning process.

In step S11, the detection signals from the above-mentioned sensors are read. In step S12, a target opening calculation process shown in FIG. 5 is executed to calculate a target opening THCMD of the throttle valve 3. In step S13, a VTC cleaning correction process shown in FIG. 8 is executed. That is, a correction process for the target opening THCMD accompanied with the VTC cleaning process is executed.

Figure 11:
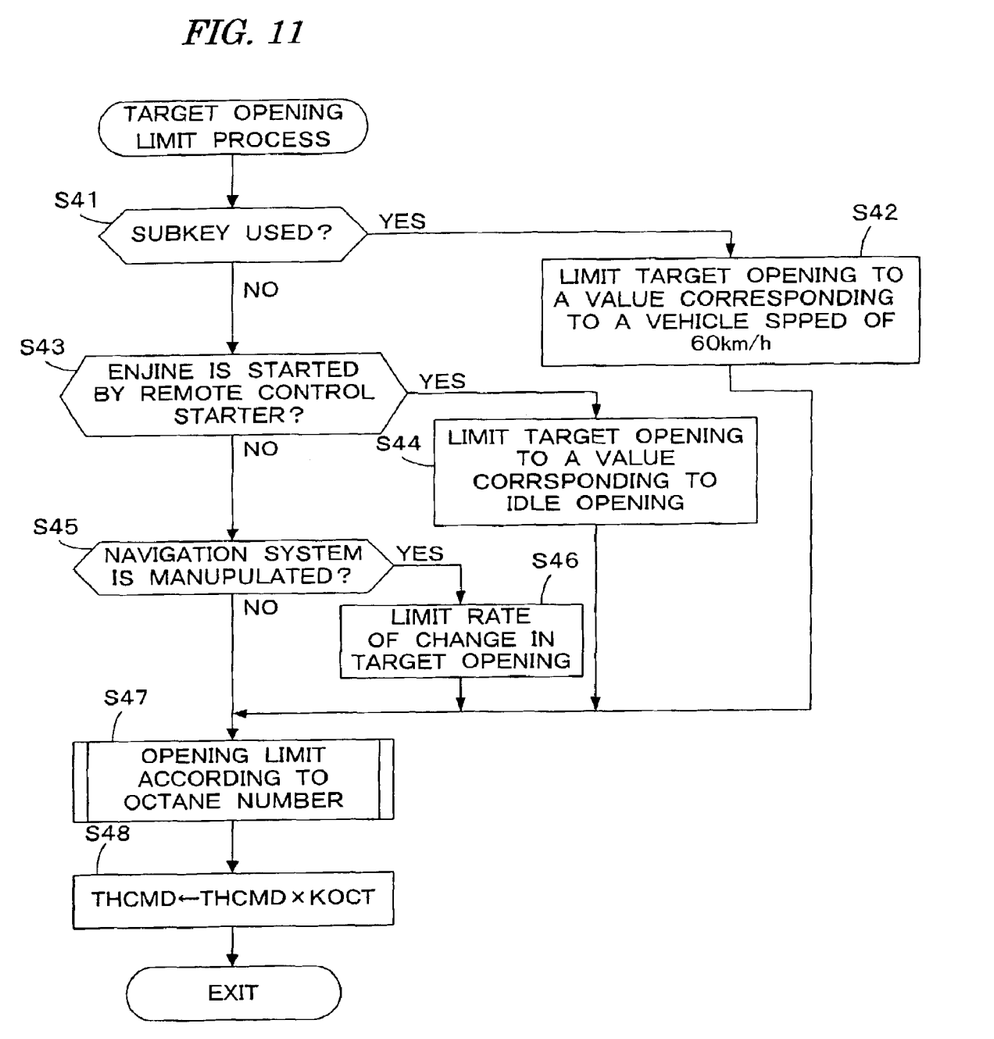
FIG. 11 is a flowchart showing a program for limiting the target opening.

In step S14, a target opening limit process shown in FIG. 11 is executed. In step S15, a feedback control for driving the actuator 7 is executed so that the detected throttle valve opening TH coincides with the target opening THCMD.

Figure 6:
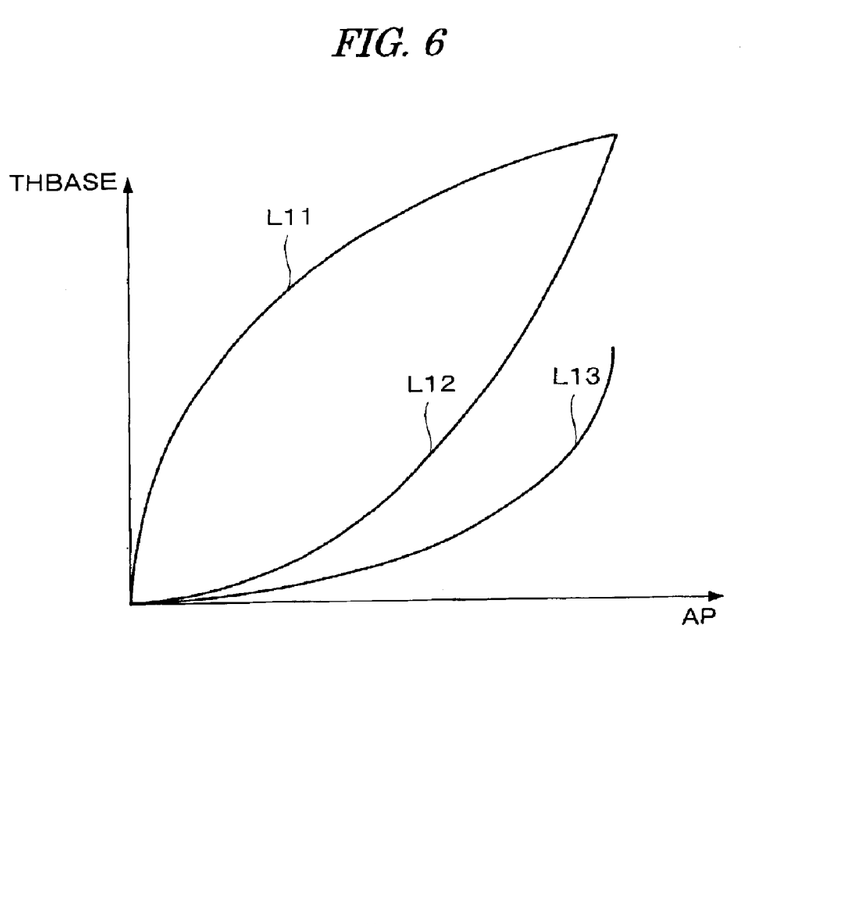
FIG. 6 is a graph showing a THBASE table used in the process of FIG. 5.

FIG. 5 is a flowchart of the target opening calculation process executed in step S12 shown in FIG. 4. In step S21, a THBASE table shown in FIG. 6 is retrieved according to the depression amount AP of the accelerator pedal and the shift position SP of the transmission to calculate a basic value THBASE of the target opening. When the shift position SP is a first-speed position, a line L11 shown in FIG. 6 is selected. When the shift position SP is a second-speed position or a higher-speed position, a line L12 shown in FIG. 6 is selected. When the shift position SP is a reverse position, a line L13 shown in FIG. 6 is selected. Each of the lines L11, L12, and L13 is set so that the basic value THBASE increases with an increase in the depression amount AP of the accelerator pedal.

Figure 7:
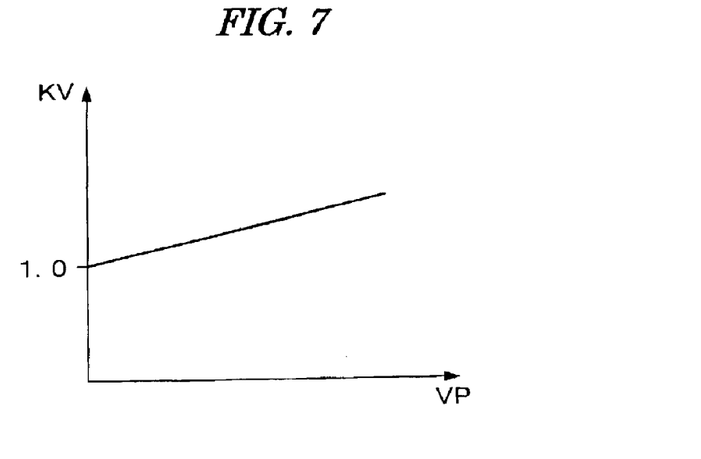
FIG. 7 is a graph showing a KV table used in the process of FIG. 5.

In step S22, a KV table shown in FIG. 7 is retrieved according to the vehicle speed VP to calculate a correction coefficient KV. The KV table is set so that the minimum value of the correction coefficient KV is set to "1.0" and the correction coefficient KV increases with an increase in the vehicle speed VP.

In step S23, the target opening THCMD is calculated from the following equation.

$$THCMD = THBASE \times KV$$

FIG. 8 is a flowchart of the VTC cleaning correction process executed in step S13 shown in FIG. 4.

Figure 9:
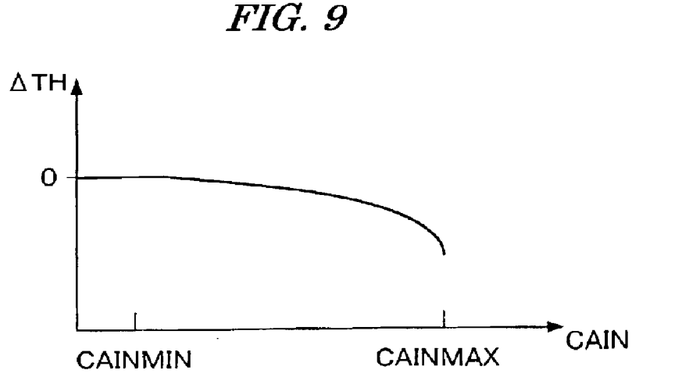
FIG. 9 is a graph showing a table used in the process of FIG. 8.

In step S31, it is determined whether or not the VTC cleaning process is in execution. If the VTC cleaning process is not in execution, this process immediately ends. If the VTC cleaning process is in execution, a ΔTH table shown in FIG. 9 is retrieved according to the operating phase CAIN of each intake valve to calculate a correction value ΔTH (negative value) (step S32). The ΔTH table is set so that the absolute value of the correction value ΔTH increases with an advance in the operating phase CAIN of each intake valve.

In step S33, the target opening THCMD is calculated from the following equation.

$$THCMD = THCMD + \Delta TH$$

Figure 10A:
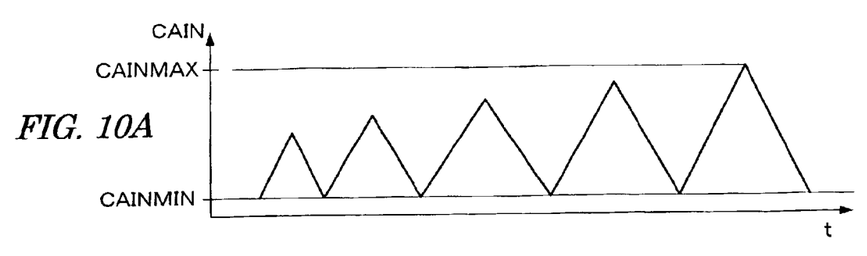
FIGS. 10A and 10B are time charts showing changes in operating phase (CAIN) of an intake valve and changes in correction value (ΔTH) of the target opening during execution of the cleaning process, respectively.
Figure 10B:
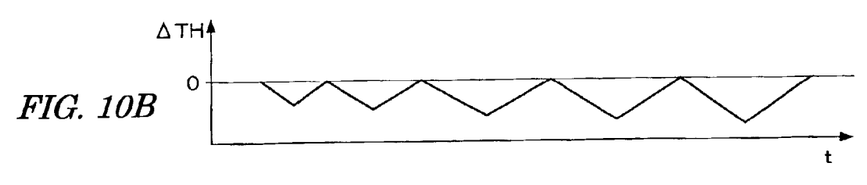

The operating phase CAIN of each intake valve changes as shown in FIG. 10A in the VTC cleaning process. That is, the solenoid valve 44 is operated with a relatively small amplitude in the initial stage of the VTC cleaning process. Thereafter, an amplitude of changing the opening degree of the solenoid valve 44 is gradually increased. Finally, the solenoid valve 44 is operated so that the operating phase CAIN finally changes from the most retarded phase CAINMIN to the most advanced phase CAINMAX. According to this change of the operating phase CAIN, the correction value ΔTH calculated in step S32 in FIG. 8 changes as shown in FIG. 10B.

FIG. 11 is a flowchart of the target opening limit process executed in step S14 shown in FIG. 4.

In step S41, it is determined whether or not a subkey is being used. The subkey is a key which can only lock/unlock the doors of the vehicle and operate the ignition switch of the vehicle. Unlike a normal key (main key), the subkey cannot lock/unlock the trunk box and the glove box of the vehicle. If the subkey is being used, the target opening THCMD is limited to a value which enables the vehicle to run at a maximum speed of 60 km/h (step S42). For example, the subkey is used when an attendant of a parking lot where a key of the vehicle is left to the attendant, operates the vehicle. Accordingly, a high-speed running is not required in such a case, and it is possible by limiting the throttle valve opening to obtain an effect of preventing a rapid start of the vehicle when using the subkey.

If the answer to step S41 is negative (NO), it is determined whether or not the engine 1 is being started by a remote control starter (step S43). The remote control starter is a device for starting the engine at a position remote from the vehicle. During the engine startup by means of the remote control starter, it is sufficient to enable only starting of the engine. Therefore, the target opening THCMD is limited to an idle opening (step S44). As a result, it is possible to avoid a situation such that the engine speed may rapidly increase due to any abnormality occurring when using the remote control starter.

If the answer to step S43 is negative (NO), it is determined whether or not a navigation system (not shown) provided in the vehicle is being operated (step S45). During operation of the navigation system, there is a possibility that a driver's attention to the front may be reduced. To avoid this possibility, the rate of change in the target opening THCMD is limited to a predetermined rate or less (step S46). Specifically, if a target opening change amount DTHCMD= (THCMD(k)−THCMD(k−1)) as a difference between a preceding value THCMD(k−1) and a present value THCMD(k) of the target opening THCMD is greater than a predetermined change amount DTH0, the present value THCMD(k) is changed to a sum of the preceding value THCMD(k−1) and the predetermined change amount DTH0. Accordingly, a rapid acceleration of the vehicle can be prevented.

Figure 12:
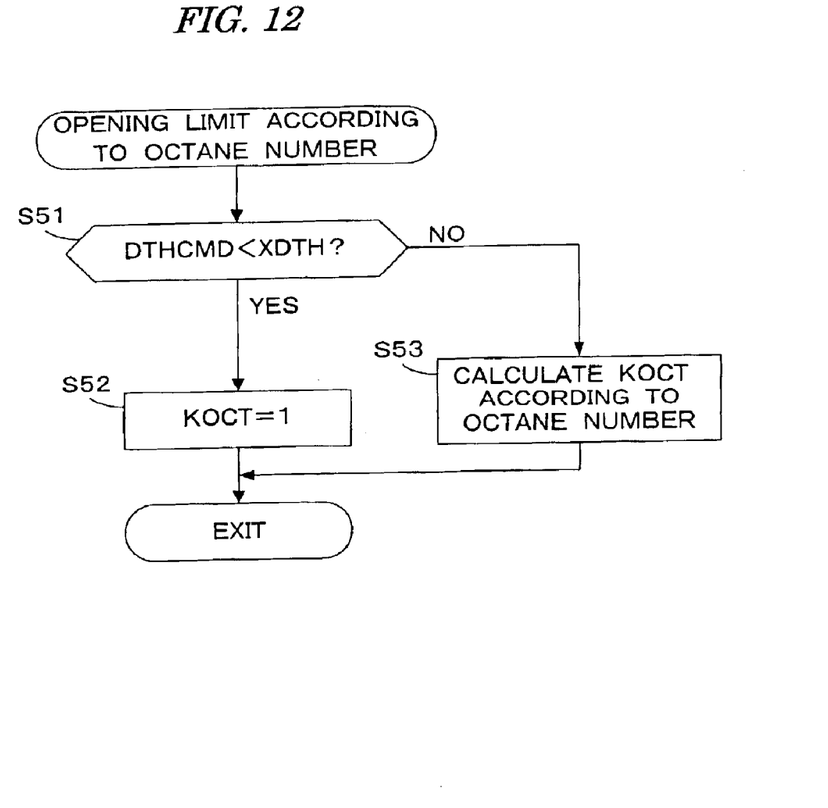
FIG. 12 is a flowchart showing a program for calculating an opening limit coefficient (KOCT) according to an octane number.

In step S47, an opening limit process according to an octane number shown in FIG. 12 is executed. By the process shown in FIG. 12, an opening limit coefficient KOCT is calculated.

In step S48, the target opening THCMD is corrected by using the opening limit coefficient KOCT in accordance with the following equation.

$$THCMD = THCMD \times KOCT$$

FIG. 12 is a flow chart of the opening limit process according to the octane number executed in step S46 shown in FIG. 11.

In step S51, it is determined whether or not the target opening change rate DTHCMD is smaller than a predetermined change rate XDTH (e.g., 2 degrees/5 msec). If DTHCMD is less than XDTH, it is determined that the target opening limit according to the octane number is not required, and the opening limit coefficient KOCT is set to "1" (step S52).

Figure 13:
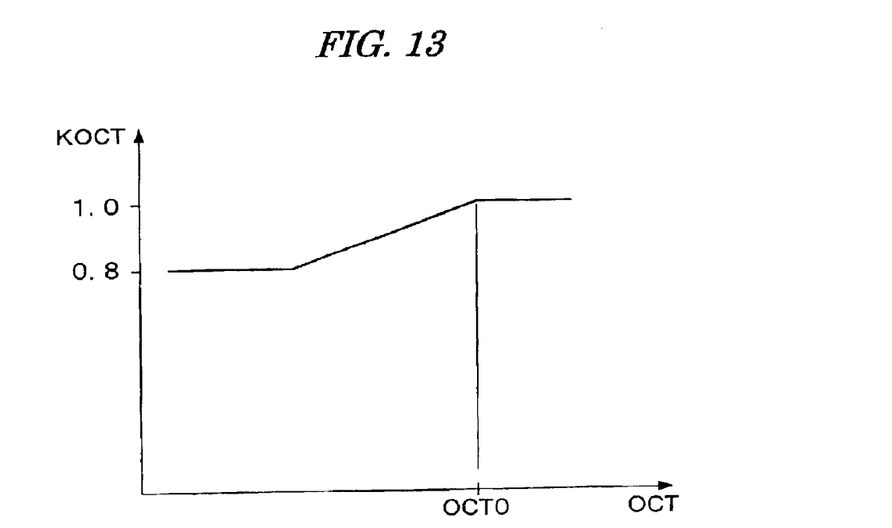
FIG. 13 is a graph showing a table used in the process of FIG. 12.

If DTHCMD is greater than or equal to XDTH, a KOCT table shown in FIG. 13 is retrieved according to the octane number OCT of the fuel in use to calculate the opening limit coefficient KOCT (step S53). The KOCT table is set so that the opening limit coefficient KOCT is set to "1.0" in the range where the octane number OCT is higher than a standard octane number OCT0 for the engine 1 and the opening limit coefficient KOCT decreases with a decrease in the octane number OCT in the range where the octane number OCT is lower than the standard octane number OCT0. Accordingly, the target opening THCMD is corrected so that it decreases with a decrease in the octane number OCT.

The octane number OCT of the fuel in use is estimated by a process (not shown) executed by the CPU in the ECU 5 according to an output from a knocking sensor (not shown) for detecting occurrence of the knocking, the detected engine speed NE, and the detected absolute intake pressure PBA. The estimation of the octane number OCT is carried out generally in the following manner.

First, the octane number OCT is set to the standard octane number OCT0. When the condition that knocking is not detected by the knocking sensor continues for a predetermined ignition time period, an addition term DRUP set according to the engine speed NE and the absolute intake pressure PBA is calculated, and the octane number OCT is incremented by the addition term DRUP in accordance with the following equation.

$$OCT = OCT + DRUP$$

In contrast, when the knocking is detected by the knocking sensor, the octane number OCT is decremented in accordance with the following equation. DRDOWN in the following equation is a predetermined subtraction value.

$$OCT = OCT − DRDOWN$$

By making such calculation, the octane number OCT becomes a value depending on the frequency of occurrence of the knocking, and this value can be used as an estimated octane number of the fuel in use.

Further, the octane number OCT thus calculated is subjected to a limit process such that it falls within a predetermined range from a lower limit to an upper limit.

The details of the estimation method for the octane number is described in Japanese Patent No. 2844418, the contents of which are hereby incorporated by reference.

According to the process shown in FIG. 12, when the change rate DTHCMD in the target opening THCMD of the throttle valve 3 is large, i.e., when the accelerator pedal is rapidly depressed, the target opening THCMD is so corrected as to be decreased according to the octane number OCT of the fuel in use. As a result, the rate of change in the throttle valve opening TH (the operating speed of the throttle valve 3) is decreased according to the octane number OCT. Therefore, in the case where a fuel of a low octane number is used, it is possible to effectively suppress the knocking that is prone to occur when the intake air amount rapidly increases. Further, unlike the conventional method of limiting the target opening THCMD to a value which is less than or equal to an upper limit, this embodiment adopts a method of correcting the target opening THCMD in the decreasing direction only when the target opening THCMD rapidly increases. Accordingly, the output of the engine can be maximized to thereby avoid a situation such that the engine output may become insufficient.

Those skilled in the art will recognize that the throttle valve 3 and the actuator 7 correspond to the intake air amount control means, and the ECU 5 constitutes the cleaning means and the control means. Specifically, the control of changing the electric current supplied to the solenoid valve 44 by the ECU 5 to thereby change the operating phase CAIN of each intake valve as shown in FIG. 10A corresponds to the cleaning means. The process shown in FIG. 8 corresponds to the control means.

The present invention is not limited to the above-preferred embodiment, but various modifications may be made. For example, the intake air amount control means may consist of an auxiliary air passage bypassing the throttle valve 3 and an auxiliary air amount control valve provided in the auxiliary air passage.

In the above embodiment, the second valve operating characteristic varying mechanism 42 is adapted to vary only the operating characteristic of each intake valve. Alternatively, the mechanism 42 may be adapted to vary only the operating phase of each exhaust valve, or both the operating phase of each intake valve and the operating phase of each exhaust valve. In the case where the second valve operating characteristic varying mechanism 42 is adapted to vary only the operating phase of each exhaust valve, the ΔTH table is set so that the absolute value of the correction value ΔTH increases (the intake air amount decreases) with a retard in the operating phase of each exhaust valve. Further, in the case where the second valve operating characteristic varying mechanism 42 is adapted to vary both the operating phase of each intake valve and the operating phase of each exhaust valve, the ΔTH table is set so that the absolute value of the correction value ΔTH increases with a decrease in a difference between the operating phase of each intake valve and the operating phase of each exhaust valve.

Further, in the above embodiment, the throttle valve opening TH is detected by the throttle opening sensor 4. In addition to the throttle opening sensor 4, gear teeth measuring means for measuring the number of teeth of a rotating gear provided between the actuator 7 and the valve element of the throttle valve 3 may be provided. The gear teeth measuring means employs an optical pickup or magnetic pickup for measuring the number of rotating gear teeth when the throttle valve 3 is opened from its fully closed position. The measured number of gear teeth is proportional to the throttle valve opening TH, so that the throttle valve opening TH detected by the throttle opening sensor 4 can be calibrated according to the measured number of gear teeth, thereby obtaining an accurate value of the throttle valve opening TH.

When using a DC motor as the actuator 7, current measuring means for measuring an electric current to be supplied to the DC motor may be provided. In this case, a throttle valve opening is calculated according to an output from the current measuring means, and the throttle valve opening TH detected by the throttle opening sensor 4 is calibrated using the opening calculated according to the measured electric current.

Further, the actuator 7 may be provided with a mechanism for maintaining the opening of the throttle valve 3 at a predetermined opening when the operation of the actuator 7 is stopped. When the throttle opening sensor 4 fails and the operation of the actuator 7 is stopped, the vehicle can be driven for evacuation without stopping the engine 1. Further, the air-fuel ratio of the air-fuel mixture to be supplied to the engine 1 may be decreased with an increase in the load on the engine 1 according to the output from the acceleration sensor 31 and the load of auxiliaries of the engine 1.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having at least one intake valve and at least one exhaust valve, said control system comprising:
    intake air amount control means for controlling an intake air amount of said engine;
    a valve operating characteristic varying mechanism for continuously varying an operating phase of at least one of said at least one intake valve and said at least one exhaust valve;
    a hydraulic control valve for controlling a hydraulic pressure to be supplied to said valve operating characteristic varying mechanism;
    cleaning means for performing a cleaning operation of said hydraulic control valve when said engine operates in a predetermined operating condition; and
    control means for controlling an operation of said intake air amount control means according to an operating condition of said valve operating characteristic varying mechanism when said cleaning means performs the cleaning operation.

2. A control system according to claim 1, wherein said valve operating characteristic varying mechanism continuously varies the operating phase of said at least one intake valve with a fixed operating phase of said at least one exhaust valve, and said control means controls said intake air amount control means so as to decrease the intake air amount with an advance in the operating phase of said at least one intake valve.

3. A control system according to claim 1, wherein said valve operating characteristic varying mechanism continuously varies the operating phase of said at least one exhaust valve with a fixed operating phase of said at least one intake valve, and said control means controls said intake air amount control means so as to decrease the intake air amount with a retard in the operating phase of said at least one exhaust valve.

4. A control system according to claim 1, wherein said valve operating characteristic varying mechanism continuously varies the operating phases of said at least one intake valve and said at least one exhaust valve, and said control means controls said intake air amount control means so as to decrease the intake air amount with a decrease in a difference between the operating phase of said at least one intake valve and the operating phase of said at least one exhaust valve.

5. A control system according to claim 1, wherein the predetermined operating condition of said engine is an operating condition in which a fuel supply to said engine is interrupted.

6. A control system according to claim 1, wherein said cleaning means performs the cleaning operation by changing an opening degree of said hydraulic control valve.

7. A control system according to claim 6, wherein said cleaning means gradually increases an amplitude of change in the opening degree of said hydraulic control valve to perform said cleaning operation.

8. A control method for an internal combustion engine having at least one intake valve and at least one exhaust valve, said engine being provided with a valve operating characteristic varying mechanism for continuously varying an operating phase of at least one of said at least one intake valve and said at least one exhaust valve, and a hydraulic control valve for controlling a hydraulic pressure to be supplied to said valve operating characteristic varying mechanism, said control method comprising the steps of:
    a) performing a cleaning operation of said hydraulic control valve when said engine operates in a predetermined operating condition; and
    b) controlling an intake air amount according to an operating condition of said valve operating characteristic varying mechanism when the cleaning operation of said hydraulic control valve is performed.

9. A control method according to claim 8, wherein said valve operating characteristic varying mechanism continuously varies the operating phase of said at least one intake valve with a fixed operating phase of said at least one exhaust valve, and the intake air amount is controlled to decrease with an advance in the operating phase of said at least one intake valve.

10. A control method according to claim 8, wherein said valve operating characteristic varying mechanism continuously varies the operating phase of said at least one exhaust valve with a fixed operating phase of said at least one intake valve, and the intake air amount is controlled to decrease with a retard in the operating phase of said at least one exhaust valve.

11. A control method according to claim 8, wherein said valve operating characteristic varying mechanism continuously varies the operating phases of said at least one intake valve and said at least one exhaust valve, and the intake air amount is controlled to decrease with a decrease in a difference between the operating phase of said at least one intake valve and the operating phase of said at least one exhaust valve.

12. A control method according to claim 8, wherein the predetermined operating condition of said engine is an operating condition in which a fuel supply to said engine is interrupted.

13. A control method according to claim 8, wherein the cleaning operation is performed by changing an opening degree of said hydraulic control valve.

14. A control method according to claim 13, wherein an amplitude of change in the opening degree of said hydraulic control valve is gradually increased to perform said cleaning operation.

* * * * *